United States Patent
VanBlon et al.

(10) Patent No.: US 12,384,373 B2
(45) Date of Patent: Aug. 12, 2025

(54) AUTOMATED ASSISTANCE WITH ONE-PEDAL DRIVING

(71) Applicant: Lenovo (Singapore) Pte. Ltd., New Tech Park (SG)

(72) Inventors: Russell Speight VanBlon, Raleigh, NC (US); Nathan Peterson, Oxford, NC (US); John C. Mese, Cary, NC (US); Arnold Weksler, Raleigh, NC (US); Mark Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 263 days.

(21) Appl. No.: 17/722,165

(22) Filed: Apr. 15, 2022

(65) Prior Publication Data
US 2023/0331229 A1   Oct. 19, 2023

(51) Int. Cl.
*B60W 30/18*   (2012.01)
*B60W 20/20*   (2016.01)
*B60W 40/09*   (2012.01)
*B60W 50/10*   (2012.01)

(52) U.S. Cl.
CPC ...... *B60W 30/18127* (2013.01); *B60W 20/20* (2013.01); *B60W 40/09* (2013.01); *B60W 50/10* (2013.01); *B60W 2540/225* (2020.02); *B60W 2540/30* (2013.01); *B60W 2555/20* (2020.02)

(58) Field of Classification Search
CPC ........... B60W 30/18127; B60W 20/20; B60W 40/09; B60W 50/10; B60W 2540/225; B60W 2555/20; B60W 2540/30
See application file for complete search history.

(56) References Cited

U.S. PATENT DOCUMENTS

| | | | | |
|---|---|---|---|---|
| 4,388,618 A | * | 6/1983 | Finger ................ | G01R 31/3833 340/636.15 |
| 2001/0027368 A1 | * | 10/2001 | Minowa .............. | B60W 10/184 701/93 |
| 2003/0076109 A1 | * | 4/2003 | Verbrugge .......... | G01R 31/392 324/427 |
| 2009/0069149 A1 | * | 3/2009 | Okumura ........ | B60W 30/18127 477/29 |
| 2012/0138395 A1 | * | 6/2012 | Curtis ..................... | B60L 50/40 701/70 |

(Continued)

FOREIGN PATENT DOCUMENTS

| CN | 109515200 A | * | 3/2019 | |
|---|---|---|---|---|
| CN | 111196164 A | * | 5/2020 | ................ B60L 7/18 |

OTHER PUBLICATIONS

Machine translation CN-109515200-A (Year: 2019).*

(Continued)

*Primary Examiner* — Hussein Elchanti
*Assistant Examiner* — Kenneth M Dunne
(74) *Attorney, Agent, or Firm* — Kunzler Bean & Adamson

(57) ABSTRACT

Apparatuses, methods, systems, and program products for regenerative braking vehicles are provided. An apparatus includes a processor in a regenerative braking vehicle that has a one-pedal control and a memory connected to the processor that stores code executable by the processor to detect a driving context, monitor a regenerative battery system of the vehicle, and automatically adjust a regenerative intensity based at least in part upon the driving context and the regenerative battery system.

20 Claims, 5 Drawing Sheets

(56) References Cited

U.S. PATENT DOCUMENTS

| | | | | |
|---|---|---|---|---|
| 2012/0325042 | A1* | 12/2012 | Takiguchi | B60L 50/16 |
| | | | | 74/513 |
| 2015/0258897 | A1* | 9/2015 | Okada | B60L 3/0046 |
| | | | | 318/376 |
| 2016/0187432 | A1* | 6/2016 | Saint-Marcoux | B60L 3/0046 |
| | | | | 702/63 |
| 2017/0297547 | A1* | 10/2017 | Goto | B60T 13/745 |
| 2017/0361851 | A1* | 12/2017 | Takeya | B60W 10/18 |
| 2018/0093571 | A1* | 4/2018 | Hall | B60L 7/08 |
| 2018/0141557 | A1* | 5/2018 | Nefcy | B60K 6/48 |
| 2018/0304869 | A1* | 10/2018 | Hernandez | B60T 7/042 |
| 2019/0126759 | A1* | 5/2019 | Miller | B60L 7/18 |
| 2020/0039498 | A1* | 2/2020 | Passman | B60W 30/18127 |
| 2020/0055402 | A1* | 2/2020 | Camhi | B60W 30/18127 |
| 2020/0101843 | A1* | 4/2020 | Suzuki | B60L 15/2045 |
| 2020/0207212 | A1* | 7/2020 | Yoshida | B60W 30/16 |
| 2022/0032771 | A1* | 2/2022 | Choi | G06T 19/006 |
| 2022/0063626 | A1* | 3/2022 | Kaneko | B60L 7/10 |
| 2022/0105925 | A1* | 4/2022 | Naserian | B60W 10/184 |
| 2022/0194231 | A1* | 6/2022 | Kufner | B60L 15/2009 |
| 2022/0250634 | A1* | 8/2022 | Weston | B60W 50/038 |
| 2022/0348201 | A1* | 11/2022 | Ostafew | B60W 50/0098 |

OTHER PUBLICATIONS

Machine translation CN-111196164 (Year: 2020).*
Liu et al, "Evaluation of regenerative braking based on single-pedal control for electric vehicles", 2020, Springer (Year: 2020).*

\* cited by examiner

AUTOMATED ASSISTANCE WITH ONE-PEDAL DRIVING

FIELD

The subject matter disclosed herein relates to one-pedal driving and more particularly relates to automatically assisting a driver with one-pedal driving.

BACKGROUND

One-pedal driving allows the driver of a regenerative braking vehicle to conveniently control the acceleration and braking of a vehicle with a single pedal. One-pedal driving typically uses a regenerative braking system to slow the vehicle as well as to regenerate electricity, which can be used to recharge the vehicle's regenerative battery system. When one-pedal driving, drivers don't know when to start regenerative braking nor how much pressure to apply to the one-pedal, which can result in slowing down too soon or too late, which in turn results in less-than-optimal driving efficiency and safety. Drivers can learn this "skill" at low speeds within a few weeks, but it is very difficult to master one-pedal driving at speeds above 35 mph even after many months of driving.

BRIEF SUMMARY

Apparatuses, methods, systems, and program products are disclosed for automatically assisting a driver with one-pedal driving. An apparatus, in one embodiment, includes a processor in a regenerative braking vehicle that has a one-pedal control and a memory, coupled to the processor, that stores code executable by the processor to detect a driving context, monitor a regenerative battery system of the vehicle, and automatically adjust a regenerative intensity of the vehicle based at least in part upon the driving context and the regenerative battery system.

A method, in one embodiment, includes detecting a driving context for a regenerative braking vehicle that has a one-pedal control, monitoring a regenerative battery system of the vehicle, and automatically adjusting a regenerative intensity of the vehicle based at least in part upon the driving context and the regenerative battery system.

A program product, in one embodiment, includes computer readable storage medium that stores code executable by a processor. In one embodiment, the code is executable by the processor to detect a driving context for a regenerative braking vehicle that has a one-pedal control, monitor a regenerative battery system of the vehicle, and automatically adjust a regenerative intensity of the vehicle based at least in part upon the driving context and the regenerative battery system.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be limiting of scope, the embodiments will be described and explained with additional specificity and detail using the accompanying drawings, in which.

DETAILED DESCRIPTION

Figure 1A:
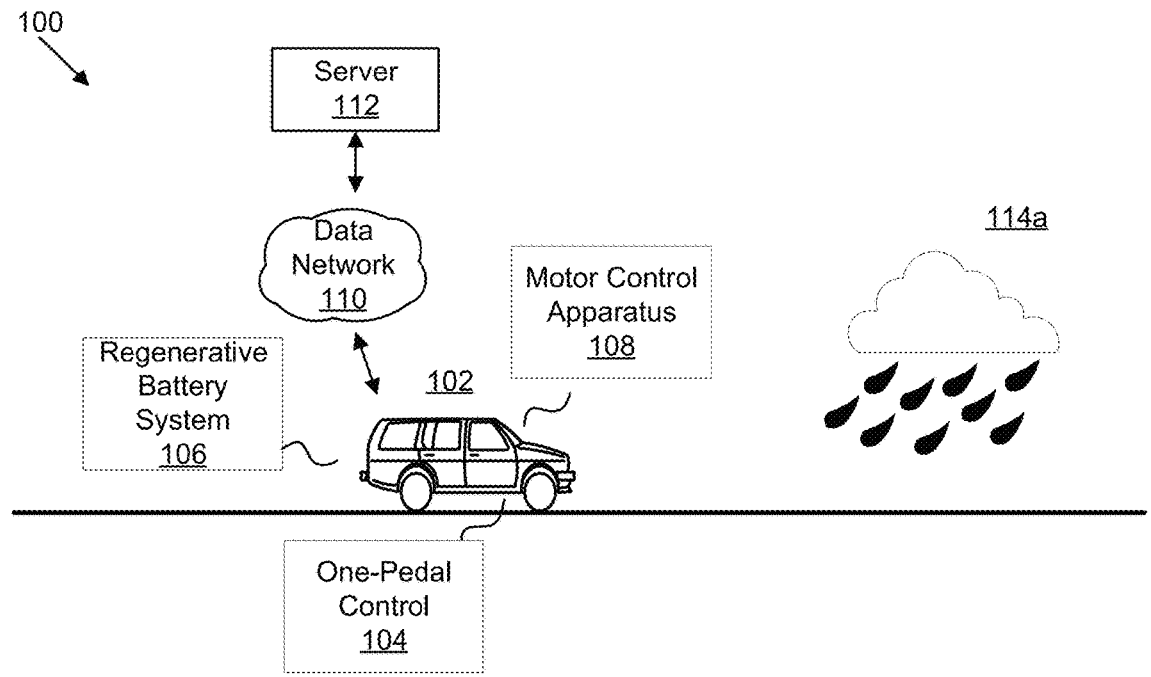
FIG. 1A is a schematic block diagram illustrating one embodiment of a system for automated assistance with one-pedal driving.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The apparatuses, methods, systems, program products, and their respective embodiments disclosed herein facilitate and assist one-pedal driving. The description of elements in each figure may refer to elements of proceeding figures. Like numbers refer to like elements in all figures, including alternate embodiments of like elements.

FIG. 1A is a schematic block diagram illustrating one embodiment of a system for automated assistance with one-pedal driving. In one embodiment, the system 100 includes a regenerative braking vehicle (RBV) 102, a one-pedal control 104, a regenerative battery system 106, a motor control apparatus 108, a data network 110, and a server 112. As used herein, the RBV 102 may refer to any type of vehicle including but not limited to electric vehicles (EVs), hybrid combustion/electric vehicles (i.e., HCEVs, HEVs, PHEVs, etc.), semi-trucks, buses, trains, trams, motorcycles, or other type of vehicle that uses regenerative braking as an energy recovery mechanism to recharge its regenerative battery system 106. Regenerative braking converts the vehicle's momentum or kinetic energy into electricity, which may then be stored for travel distance optimization or other electrical needs of the RBV 102. But overcharging the regenerative braking system could result in damage to the batteries.

The RBV 102 may be used for the same purposes that combustion engine vehicles are used and may include similar features. For example, the RBV 102 may also include similar steering mechanisms, including, for example, a steering wheel and column, a joystick, or the like. In addition to the one-pedal, the RBV 102 may include a mechanical, hydraulic, air, friction or other type of brake system, (e.g., brake calipers, brake pads, rotors, etc.), and a clutch pedal on manual shifted vehicles. In many embodiments, as an added safety measure, such braking systems continue to be relied upon for emergency stops and for parking brake purposes. Also, when a driver uses regenerative braking, the brake lights engage just as if the driver were using the mechanical brake system. The RBV 102 may also include gauges, displays, cameras, stereos, speakers, etc., that are typically found on combustion engine vehicles. In addition, sensors may be attached to driver instruments, including, for example, the steering mechanism, braking system, and one-pedal control 104, and the like, to relay information about the operation of such mechanisms, systems, or controls.

In some embodiments, the RBV 102 may include aftermarket devices, which are either installed permanently or are readily removable. In certain embodiments, the RBV 102 may be configured to mount, hold, or otherwise couple to a mobile device (e.g., smart phone or navigation device), which may become part of the computing, communication, navigation, or display device for the RBV 102. In some embodiments, the smart phone, or other mobile device, may be operably coupled to the RBV 102 to enable a driver to interact with the smart phone, receive data from the RBV 102, turn on/off using controls on the RBV 102, and/or the like. Otherwise, the computing, communication, navigation, or display device may be integrated into the RBV 102 to form a single unit. The computing device may comprise various processors or processor cores, memory, storage, network connectivity chips, graphics chips, audio chips, and/or the like. The RBV 102 may be configured to receive or send electronic signals and process data inputs, such as camera inputs and the like.

Some RBVs 102 implement the one-pedal control 104. The one-pedal control 104 enables the driver to accelerate and decelerate using a single pedal (e.g., accelerator), paddle, lever, or the like. For purposes of this document, "one-pedal control" will be used to refer to any or all of these various implementations. The one-pedal control 104 may be controlled by the driver's hand, foot, etc., which accommodates and facilitates driving for unimpaired and impaired drivers.

In one embodiment, the driver may modify (i.e., release, maintain, or increase) pressure upon the one-pedal control 104, which adjusts a motor torque of the RBV 102 by dynamically transferring power between an accelerator and a regenerative braking system of the RBV 102. Drivers may slow the RBV 102 or even come to a full stop without using a mechanical brake pedal and an associated mechanical braking system (i.e., brake calipers, brake pads, rotors, etc.). Rather, the one-pedal control 104 can conveniently be used to control both positive and negative torque on an electric motor. Positive torque propels (i.e., accelerates) the RBV 102 and negative torque (braking) slows the RBV 102. In other words, if the driver applies pressure upon the one-pedal control 104, the RBV 102 accelerates. If the driver maintains the pressure, the RBV 102 maintains its acceleration, speed, or "coasts." If the driver lifts the pressure, the RBV 102 decelerates. The rate of acceleration or deceleration, in various embodiments, may be adjusted according to an automated system as discussed further herein. In some embodiments, RBVs 102 may also have a brake pedal (and/or clutch pedal), which would engage an associated mechanical braking system, which can be used in case of emergency stops, for example.

In one embodiment, increasing the negative torque increases the RBV motor's magnetic resistance, which not only slows the RBV's drivetrain, but can also be used to convert the RBV's kinetic energy into electricity. The RBV 102 uses this electricity to recharge its regenerative battery system 106. The amount of regeneration or regenerative intensity may be controlled by a motor control apparatus 108, which is discussed further herein.

Acceleration, deceleration, and/or regenerative intensity may be controlled in gradient levels or ranges of pressure upon the one-pedal control 104 and/or other controls. For example, if the driver "floors" the one-pedal control 104, the RBV 102 may accelerate at a maximum rate. If the driver reduces pressure upon the pedal to 50% for example, the RBV 102 may coast, if the driver further releases pressure to 25%, for example, the RBV 102 may begin slowing, and so on. These percentages may be adjusted to accommodate a driver's personal settings, which may be stored by the motor control apparatus 108, which is discussed in more detail below. The motor control apparatus 108 may also control the rate of charging the regenerative battery system 106 or the regenerative intensity.

As discussed above, the RBV 102 may include a single pedal or multiple pedals (e.g., accelerator, brake, clutch, paddle shifter), but getting comfortable with relying upon a single pedal for driving can be challenging, especially for those just learning to drive using a single pedal. When one-pedal driving, drivers often don't know how much pressure to apply and when to start regenerative braking to achieve optimal performance, safety, and proper driving protocol. For example, drivers may slow down too soon or too late, which may be annoying and dangerous for the driver, but may also annoy or endanger surrounding drivers, pedestrians, property, etc. This can also be very inefficient, which can reduce the overall mileage traveled before needing another charge. Drivers must also learn how to judge stopping distances and properly modify pressure on the one-pedal control 104 to slow or stop the RBV 102 smoothly and consistently. Drivers can often learn these "skills" at low speeds within a few weeks, but it is very difficult to master one-pedal driving at higher speeds (e.g., above 35 mph) even after many months of driving a RBV 102.

The embodiments discussed herein may provide comfort, safety, reassurance, and convenience to drivers of one-pedal vehicles 102 (and less frustration and greater safety for others) and can help train new vehicle 102 drivers to adapt to one-pedal driving more quickly. Other benefits of these embodiments include, but are not limited to, optimizing the maximum travel distance without a recharge through optimal energy conservation, extending the lifetime of the mechanical brake system, providing environmental advantages of less brake dust emission and less frequent energy consumption at recharge, providing smoother and safer slowing and stopping (i.e., less driver error due to overly slow stops or re-accelerating during a stop), and so on.

The RBV 102 may include the regenerative battery system 106. The regenerative battery system 106 may include various battery systems for RBVs 102. For example, many RBVs 102 include banks of Li+ cell batteries in daisy-chained parallel configuration as well as the hardware (e.g., circuitry, components, buses, microcontrollers, and microprocessors) and software modules to control and maintain the battery cells. The regenerative battery system 106 is described in more detail below with reference to FIGS. 2 and 3.

The system 100, in one embodiment, includes a motor control apparatus 108. A hardware appliance of the motor control apparatus 108 may include a power interface, a wired and/or wireless network interface, a wired or wireless sensor interface that attaches to one or more sensors on driver instruments (e.g., steering mechanism sensors, one-pedal sensors, mechanical braking sensors, etc.), a wired or wireless interface that attaches to a haptic device, a graphical interface that attaches to a gauge or display (e.g., LED lights), a video interface that attaches to a camera or cameras, and/or a semiconductor integrated circuit device as described below, configured to perform the functions described herein with regard to the motor control apparatus 108.

In certain embodiments, the motor control apparatus 108 is coupled to RBV 102 either by a wired connection (e.g., hardwired, a universal serial bus ("USB") connection, or other communication bus that is physically attached to the RBV 102 or a wireless connection (e.g., Bluetooth®, Wi-Fi, WAN, or the like); that attaches to an electronic display device (e.g., a television or monitor using an HDMI port, a DisplayPort port, a Mini DisplayPort port, VGA port, DVI port, or the like); and/or the like. and may also attach to a device such as a laptop computer, a server 112, a tablet computer, a smart phone, a vehicle security system, a router or switch, or the like, A hardware appliance of the motor control apparatus 108 may include a power interface, a wired and/or wireless network interface, a graphical interface that attaches to a display, and/or a semiconductor integrated circuit device as described below, configured to perform the functions described herein with regard to the motor control apparatus 108. The displays, for example, may include miniaturized and may include cathode ray tubes ("CRT"), liquid crystal displays ("LCDs"), liquid crystal on silicon ("LCos"), or organic light-emitting diodes ("OLED").

The motor control apparatus 108, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a micro-controller, an application-specific integrated circuit ("ASIC"), a processor, a processor core, or the like. In one embodiment, the motor control apparatus 108 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the motor control apparatus 108.

The semiconductor integrated circuit device or other hardware appliance of the motor control apparatus 108, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the motor control apparatus 108 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The motor control apparatus 108, in one embodiment, may be configured to detect the driving context 114, monitor the regenerative battery system 106 of the RBV 102, and automatically adjust the regenerative intensity of the RBV 102 based at least in part upon the driving context 114 and the regenerative battery system 106. The motor control apparatus 108 is described in more detail below with reference to FIGS. 2 and 3.

In certain embodiments, the motor control apparatus 108 is coupled to RBV 102 either by a wired connection (e.g., hardwired, a universal serial bus ("USB") connection, or other communication bus that is physically attached to the RBV 102) or a wireless connection (e.g., Bluetooth®, Wi-Fi, WAN, or the like). The wireless connection may also employ a Wi-Fi network based on any one of the Institute of Electrical and Electronics Engineers ("IEEE") 802.11 standards.

The motor control apparatus 108, in certain embodiments, may automatically adjust the regenerative intensity up or down if an efficiency, warning, or danger threshold is exceeded (e.g., if the driver of the RBV 102 has not reacted at all or has reacted inefficiently to a driving context 114). The motor control apparatus 108, in one embodiment, may receive feedback from sensors of driver instruments (e.g., the steering mechanism, mechanical brake, or one-pedal) and from the regenerative battery system 106, and may be configured to calculate such a threshold using well known mathematics and physics equations (e.g., $v=d/t$, velocity=displacement (distance)/time) and data collected from these and similar sensors. Such data may include any one or a combination of driving contexts 112 discussed herein.

One challenge for drivers of RBVs 102, especially drivers inexperienced with driving a RBV 102, is that the driver may not know how much to modify pressure upon the one-pedal control 104 to control the vehicle's speed properly, nor may the driver know how much to modify pressure upon the one-pedal control 104 to efficiently recharge the battery supply of the regenerative battery system 106. It is also unlikely that the driver will know how much to modify the one-pedal control 104 to optimize the regenerative aspect of the regenerative braking system 106.

The motor control apparatus 108 is configured to facilitate one-pedal driving. The motor control apparatus 108, in one embodiment, monitors the regenerative battery system 106 and automatically assists the driver by maintaining an optimal balanced charge level of the regenerative battery system 106 over the duration of travel. In travel, this can fluctuate based upon a variety of circumstances and conditions. At times, the regenerative battery system may be fully charged. In this instance, the motor control apparatus 108 may decrease or not adjust the regenerative intensity. In contrast, if the regenerative battery system 106 needs charging, the motor control apparatus 108 may increase the regenerative intensity. These may include, for example, the duration of travel, the type of travel (e.g., city/open freeway), the ambient temperature, the driver's driving style (e.g., choppy/smooth starts or braking), etc. Temperature extremes, for example, can adversely affect efficiency and optimization. Throughout the driving process, the motor control apparatus 108 may automatically assist the driver by adjusting the regenerative intensity of the RBV 102.

The data network 110, in one embodiment, includes a digital communication network that transmits digital communications. The data network 110 may include a wireless network, such as a wireless cellular network, a local wireless network, such as a Wi-Fi network, a Bluetooth® network, a near-field communication ("NFC") network, an ad hoc network, and/or the like. The data network 110 may include a wide area network ("WAN"), a storage area network ("SAN"), a local area network ("LAN") (e.g., a home network), an optical fiber network, the internet, or other digital communication network. The data network 110 may include two or more networks. The data network 110 may include one or more servers, routers, switches, and/or other networking equipment. The data network 110 may also include one or more computer readable storage media, such as a hard disk drive, an optical drive, non-volatile memory, RAM, or the like.

In embodiments where the wireless connection is a mobile telephone/cellular network, the network may be configured as a 4G network, a 5G network, a long-term evolution ("LTE") based network, and/or the like. In such an embodiment, the mobile telephone network may create and manage wireless connections between base access units for the network and user equipment ("UE") devices for the user. The wireless connection may also employ a Wi-Fi network based on any one of the Institute of Electrical and Electronics Engineers ("IEEE") 802.11 standards.

The one or more servers 110 may be embodied as blade servers, mainframe servers, tower servers, rack servers, and/or the like. The one or more servers 110 may be configured as mail servers, web servers, application servers, FTP servers, media servers, data servers, web servers, file servers, virtual servers, and/or the like. The one or more servers 110 may store, transmit, and/or the like content to be presented on the RBV 102.

The motor control apparatus 108, in one embodiment, is configured to detect a driving context 114 or a change in a driving context 114. The driving context 114 may include a wide variety of settings, conditions, or circumstances. A list of some examples of the driving context 114 may include any one or a combination of the following: weather conditions (e.g., ambient temperature (hot/cold), sunshine, fog, rain, snow, sleet, freezing rain, ice); road conditions (e.g., curved, sloped, surface viscosity, potholes, gravel, surface type (e.g., gravel, asphalt); distance to an object in an oncoming path of the RBV 102, either fixed (stop sign or signal, debris (e.g., downed tree, powerline, any object), stopped or slowing vehicle, emergency lights) or moving (e.g., change in object's velocity—slowing car in front of vehicle 102); signals or data received from an object in an oncoming path of the RBV 102 via data network 110 and/or server 112 (e.g., velocity change alerts, turning signals, road sign or traffic light notifications, debris notifications); other types of signals or data received via data network 110 and/or server 112 (e.g., artificial intelligence, weather channel updates); input from on-board vehicle 102 devices, modules, apparatuses, or systems (e.g., onboard navigation system; current velocity, weight, stopping force, input from cameras (e.g., brake lights of car ahead of vehicle 102, traffic signal change, emergency lights, driver eye movements)); social media or navigation data received via data network 110 and/or server 112 (e.g., Waze, Google Maps), crowd-sourcing, or other such metrics; driver specific data (e.g., reaction time, customized driver settings or preferences); and so on.

The motor control apparatus 108, in one embodiment, is configured to automatically adjust the regenerative intensity based at least in part upon the driving context 114 and the regenerative battery system 106. To make this determination, the motor control apparatus 108 analyzes data retrieved from modules that detect changes in driving context 114 as well as data retrieved from monitoring the regenerative battery system 106 and determines how much to adjust the regenerative intensity. Referring back to FIG. 1B above, the motor control apparatus 108 may analyze driving contexts 112, such as an object's velocity, the velocity of vehicle 102, the distance d1 (to the slowing car) or d2 (to the stop sign), the stopping force required for vehicle 102 and its contents (e.g., luggage, driver, passengers) or a trailer in tow, and road and weather conditions (e.g., slope, surface, viscosity, icy, snow-covered, wet, etc.). In addition, the motor control apparatus 108 may take into account that the regenerative battery system 106 is in need of regenerative power to optimize the charge on its battery system. Using both sets of data, the motor control apparatus 108 then determines whether to automatically adjust the regenerative intensity to bring the RBV 102 efficiently or safely to an appropriate velocity or to a complete stop.

In one embodiment, the motor control apparatus 108 may determine the optimal regenerative intensity based not only upon the data received from the regenerative battery system 106 and the driving context 114 (e.g., distance d2 to an upcoming stop sign) but also upon data received from sensors on driver instruments that monitor driver-controlled movements or the lack thereof. These sensors may detect, for example, movements of the steering mechanism, the mechanical brake, or the one-pedal control 104. Driver movements may also be detected by cameras or the like. In essence, such movements may track the driver's reaction or lack thereof to the driving context 114. For example, if the driver does not reduce pressure upon the one-pedal control 104 in anticipation of an upcoming stop sign, the monitor control apparatus 108 may calculate the optimal regenerative intensity necessary to bring the RBV 102 to a complete stop at an appropriate distance before a stop sign and then automatically adjust the regenerative intensity to make this happen.

Figure 2:
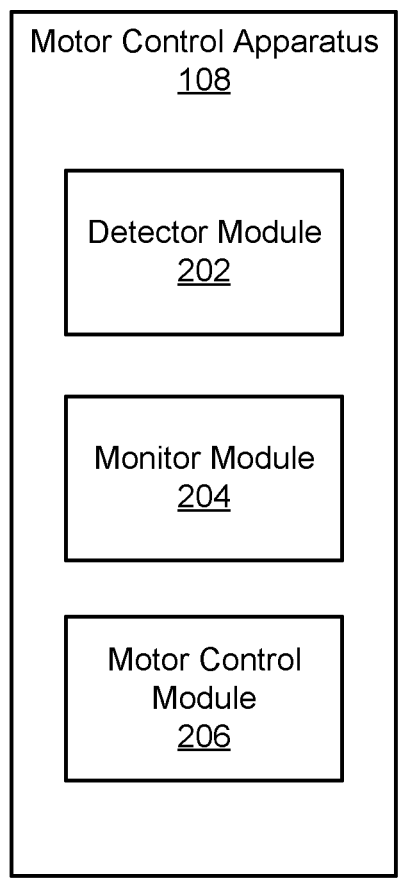
FIG. 2 is a schematic block diagram illustrating one embodiment of an apparatus for automated assistance with one-pedal driving.

FIG. 2 is a schematic block diagram illustrating one embodiment of an apparatus 200 for automated assistance with one-pedal driving. The apparatus 200, in one embodiment, may include a processor in the RBV 102 that has the one-pedal control 104 and a memory, coupled to the processor, that stores code executable to detect a driving context 114, monitor a regenerative battery system 106, and automatically adjust the regenerative intensity based at least in part upon the driving context 114 and the regenerative battery system 106.

In one embodiment, the apparatus 200 includes an instance of the motor control apparatus 108. The motor control apparatus 108, in one embodiment, includes one or more of a detector module 202, a monitor module 204, and a motor control module 206, which are described in more detail below. The motor control apparatus 108, in one embodiment, is configured to automatically adjust the regenerative intensity based at least in part upon the driving context 114 and the regenerative battery system 106. The motor control apparatus 108, in another embodiment, is configured to automatically adjust the regenerative intensity based at least in part upon the driving context 114, the regenerative battery system 106, and feedback from sensors on driver instruments, cameras, or devices that in effect monitor driver reactions or lack thereof.

The detector module 202, in one embodiment, may be integrated with or coupled to a processor and memory and may be configured to detect a driving context 114 relative to a vehicle, such as the RBV 102 described above with reference to FIG. 1A. In FIG. 1A, in one embodiment, the driving context 114a is a weather condition. The motor control apparatus 108, in some embodiments, may include detector modules 202 that use video cameras, sensors (e.g., thermometers), imaging technology (e.g., LiDAR, radar), and combinations of these technologies to provide enhanced navigation and visibility. Cameras can view, enhance, and capture relevant data in the line of sight. Cameras can also be used in the RBV 102 to capture driver reactions based upon eye movement or facial expressions. LiDAR emits pulsed light waves from a laser and bounces these laser beams off surrounding objects. In some embodiments, LiDAR can be rotated to create data points and images pertaining to an object, distance to the object, and the object's velocity (if moving), and so on. Like human perception, however, cameras and LiDAR can be blocked by inclement weather conditions such as snow, sleet, freezing rain, fog, etc.

The motor control apparatus 108, in the FIG. 1A embodiment, may include a detector module 202 to use the limitations of camera or LiDAR data as an advantage—to detect weather. For example, detector module 202 may include a LiDAR device and if the driver of vehicle 102 were about to enter a patch of dense fog (snow or sleet storm), LiDAR laser data would bounce off the fog (or snow, sleet), and the motor control apparatus 108 could automatically adjust the regenerative intensity due in part to the lack of visibility in the projected path of the RBV 102.

The detector module 202 may also be configured to use radar (e.g., Doppler radar), which, in contrast to camera and LiDAR, uses radio wave technology, so it can "see" through inclement weather. In some embodiments, the detector module 202 combines different sensor technologies to obtain a clearer view of the oncoming roadway and any potentially dangerous objects within intended path of the RBV 102.

Figure 1B:
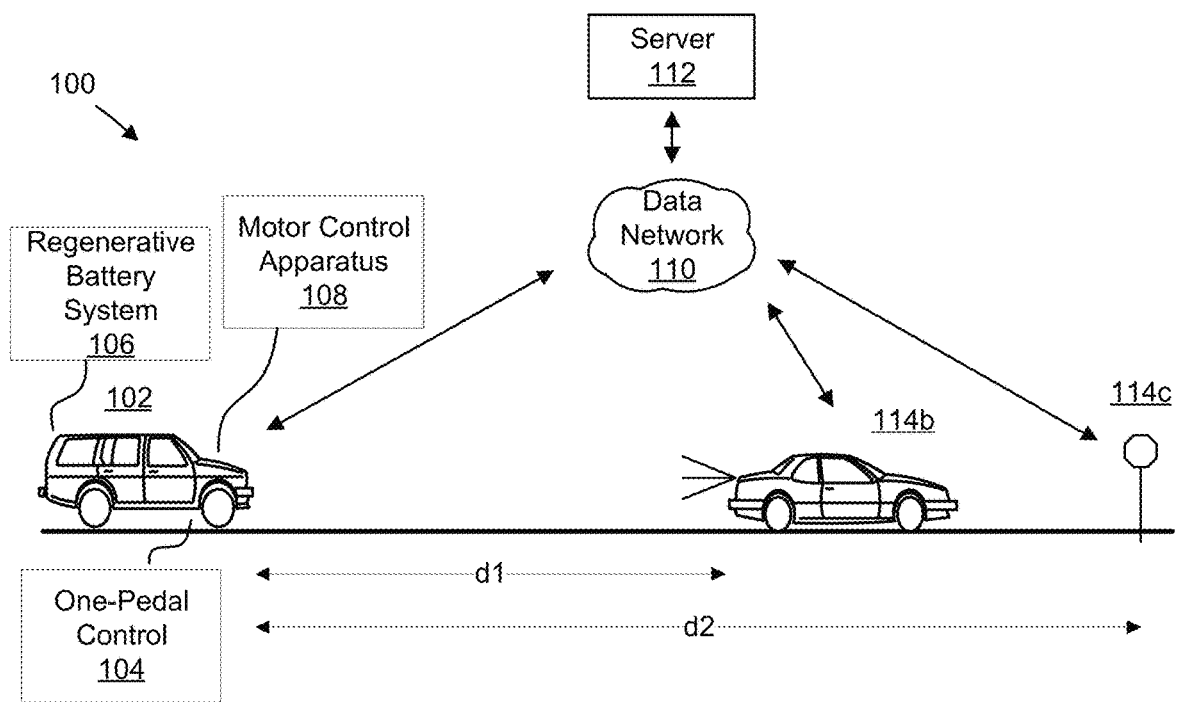
FIG. 1B is a schematic block diagram illustrating one embodiment of a system for automated assistance with one-pedal driving.

The motor control apparatus 108, in one embodiment shown in FIG. 1B, may include a detector module 202 having multiple radar sensors for triangulating data to obtain a clearer view of the oncoming roadway and any potentially dangerous objects within intended path of the RBV 102. Using two radar sensors, for example, one mounted on each side of the hood of the RBV 102, detector module 202 may be configured to detect an upcoming object (e.g., car slowing at closing distance d1 or stop sign approaching at distance d2) in the projected pathway of vehicle 102. The detector module 202 may also detect the object's velocity, dimensions, location, and position, and use this data to automatically adjust the regenerative intensity.

The detector module 202, in one embodiment, may include a radar sensor or device. For example, detector module 202 may include a radar device mounted on the RBV 102. If the oncoming path of the RBV 102 involved a corner turn with a building blocking the driver's view, for example, the detector module 202 senses objects (e.g., bicycles, people, cars, etc.) approaching that are beyond the driver's view or even other detector systems, such as LiDAR or cameras. The detector module 202 may bounce radio waves off objects like buildings, parked cars, and the like, which waves may then bounce off other objects, and eventually some of those waves bounce back to a detector mounted on the RBV 102. In one embodiment, the detector transmits the collected data to the detector module 202. The detector module 202 communicates this data to the motor control module 206. The motor control module 206 may use the collected data to automatically adjust the regenerative intensity and to not only notify the driver of the upcoming objects within the anticipated route of the RBV 102 but also that the RBV 102 is automatically adjusting the regenerative intensity.

The detector module 202, in one embodiment, may use various eye tracking algorithms, image processing algorithms, and/or sensors, e.g., cameras, motion sensors, and/or the like. These may be permanently or temporarily mounted to the RBV 102 may track the driver's eyes to detect how and when the driver's eyes move (e.g., suddenly toward a point in the upcoming path of the RBV 102, such as a person running into the street or a car slamming on its brakes or an emergency vehicle's siren; or casually in the direction of a point or area in or near the upcoming path such as an intended turn or driveway). In one embodiment, the detector module 202 may combine various sensors such as LiDAR, radar, and/or the like to detect a driving context 114.

The motor control apparatus 108, in one embodiment, includes the monitor module 204, which is configured to monitor the regenerative battery system 106 of the RBV 102. The monitor module 204 may have a centralized architecture or a distributed or modular architecture. The monitor module 204 may be connected in series with battery cells in some embodiments and may be connected in parallel in other embodiments.

As explained above, the driver of vehicle 102 may not know how much to modify pressure upon the one-pedal control 104 to control the RBV 102 properly, nor may the driver know how much to modify pressure upon the one-pedal control 104 to efficiently recharge the regenerative battery system 106. It is also unlikely that the driver will know when or how much to modify the one-pedal control 104 to optimize the regenerative aspect of the regenerative braking system 106.

The monitor module 204, in one embodiment, assists the driver by monitoring the regenerative battery system 106 and automatically maintaining an optimal balanced charge level of the regenerative battery system 106 over the duration of travel. In travel, the charge level can fluctuate based upon a variety of circumstances and conditions. At times, the regenerative battery system 106 may be fully charged. In this instance, the monitor module 204 may send a signal to the motor control module 206 to decrease or not adjust the regenerative intensity. In contrast, if the regenerative battery system 106 needs charging, the monitor module 204 may send a signal to the motor control module 206 to increase the regenerative intensity.

The monitor module 204 may monitor a variety of factors (e.g., battery temperatures, cell voltages, leakage current, etc.) with appropriate control modules, sensors, circuitry, and/or methods. These may include various software and hardware devices such as temperature sensors, voltage regulators, voltage sensors, high-speed buses, and similar circuitry. The monitor module 204 may also be configured to monitor proper charge and discharge of the cells, maintain a proper charge level, balance cells, maintain cell health, and control wear leveling of the regenerative battery system 106. In some embodiments, the monitor module 204 may be configured to avoid overvoltage, undervoltage, and excessive leakage current. In some embodiments, the monitor module 204 regulates the amount of current coming into the battery cells for charging and the amount of current going out upon discharge. The monitor module 204 works in conjunction with the motor control module 206.

Throughout the driving process, the monitor module 204 communicates with the motor control module 206 to automatically assist the driver by adjusting the regenerative intensity of the RBV 102.

The monitor module 204, in one embodiment, communicates with a processor or microprocessor, which may be included in the monitor module 204 or as a separate device. The microprocessor analyzes the data to adjust the regenerative battery system 106. Each millivolt may translate into lost efficiency of the regenerative battery system 106.

In one embodiment, the motor control module 206 is a combination of power devices and embedded micro-computers or micro-processors. Many different configurations are possible depending upon the application and type of vehicle 102.

In one embodiment, the motor control module 206 may be integrated into the motor control apparatus 108 or it may be a separate modular unit. In this embodiment, the motor control module 206 is part of the motor control apparatus 108.

The motor control module 206 may be coupled to various components within vehicle 102, including for example, the motor, the start/stop button, the one-pedal control 104, forward/reverse controls, the regenerative battery system 106, the detector module 202, the monitor module 204, and others. As mentioned above, however, the motor control module 206 works in conjunction with the monitor module 204 to ensure that the motor supplies the optimal amount of power to the regenerative braking system 106.

The motor control module 206, in one embodiment, may start/stop the motor, select forward/reverse, control speed, torque, and regenerative braking, and as mentioned above, guard against current or voltage overloads.

The monitor module 204, in one embodiment, is configured to communicate with the motor control module 206 concerning the status of the regenerative battery system 106. If for example, the regenerative battery system 106 is at or near an optimal level of charge, the monitor module 204 may communicate to the motor control module 206 that no regenerative power is needed at that moment. In contrast, if the regenerative battery system 106 is below an optimal level of charge, the monitor module 204 may communicate to the motor control module 206 that regenerative power is needed. The motor control module 206 is configured to use this information to automatically adjust the regenerative intensity.

The motor control module 206, in one embodiment, may analyze additional information or data (e.g., a change in the driving context 114, a position of a driver instrument, or a driver reaction) to determine an optimal time to automatically adjust the regenerative intensity, however. For example, if the driver releases pressure upon the one-pedal control 104 prematurely or too aggressively in anticipation of a driving context 114 (e.g., changes from yellow to red light), the motor control module 206 may use this information to automatically reduce the regenerative intensity and braking power of the vehicle. If on the other hand, the driver maintains or increases pressure upon the one-pedal control 104 beyond a normal or predetermined reaction-time threshold, then the motor control module 206 may automatically increase the regenerative intensity and braking power. This can facilitate inexperienced and even experienced drivers in achieving smooth, safe, and efficient slowing transitions over the distance d2, in FIG. 1B, for example.

In the apparatus 200, in one embodiment, the driving context 114 includes the current velocity of the RBV 102. In the apparatus 200, in one embodiment, the driving context 114 includes a distance to an object in an oncoming path of the RBV 102. In the apparatus 200, in a further embodiment, the driving context 114 includes a distance to a moving object in an oncoming path of the RBV 102. In the apparatus 200, in one embodiment, the driving context 114 includes a weather condition. In the apparatus 200, in one embodiment, the driving context 114 includes a road condition. In the apparatus 200, in one embodiment, the driving context 114 includes a stopping force of the RBV 102. In the apparatus 200, in one embodiment, the driving context 114 includes a customized driver setting.

Figure 3:
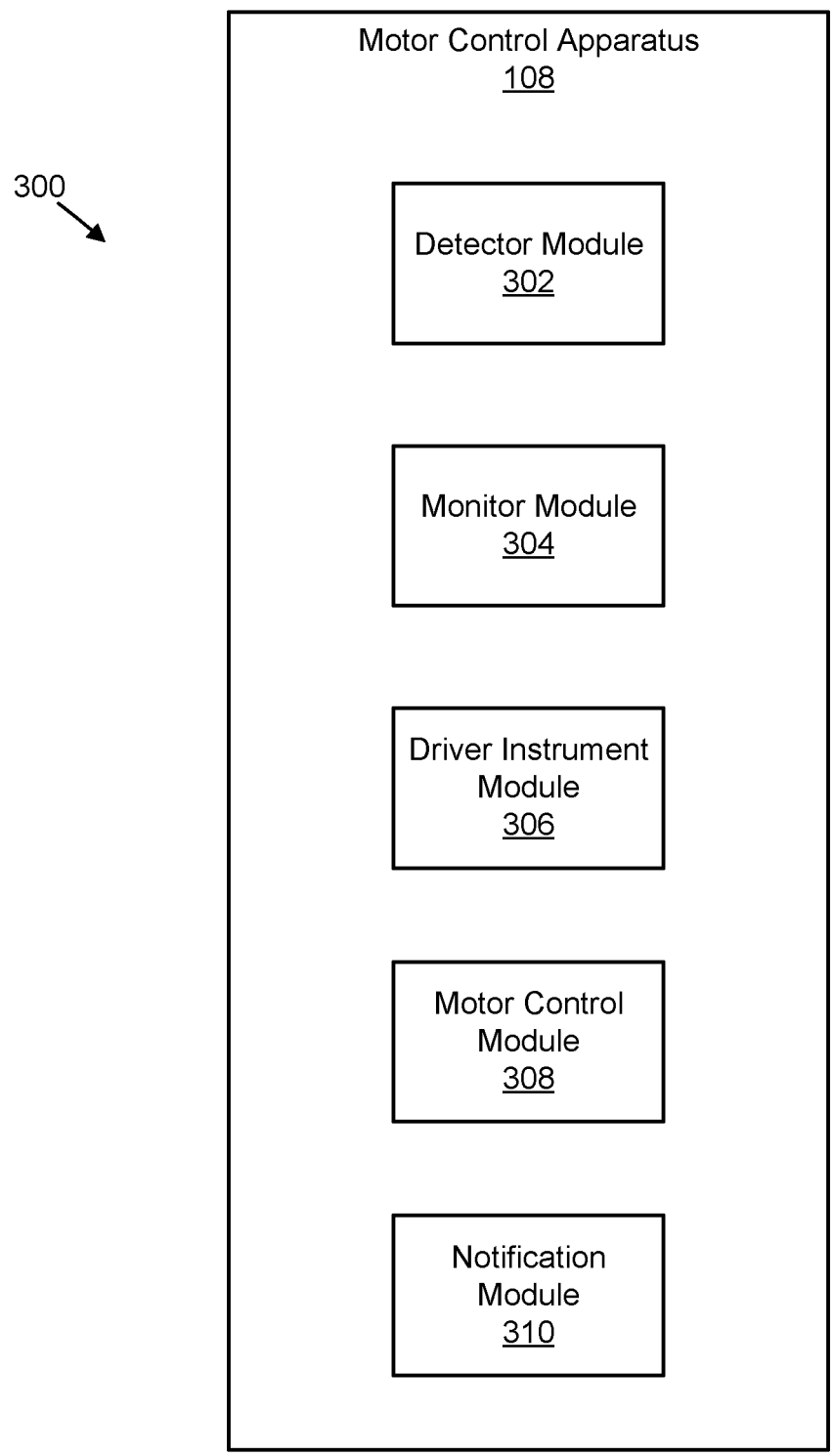
FIG. 3 is a schematic block diagram illustrating one embodiment of another apparatus for automated assistance with one-pedal driving.

FIG. 3 is a schematic block diagram illustrating one embodiment of another apparatus 300 for automated assistance with one-pedal driving. In one embodiment, the apparatus 300 includes an instance of a motor control apparatus 108. The motor control apparatus 108, in one embodiment, includes one or more of a detector module 302, a monitor module 304, a driver instrument module 306, and a motor control module 308, and a notification module 310. The detector module 302, the monitor module 304, and the motor control module 308 may be substantially similar to the detector module 202, the monitor module 204, and the motor control module 206, respectively, as described above with reference to FIG. 2.

The driver instrument module 306, in one embodiment, may be configured to receive data from one or more sensors located on one or more driver instruments (e.g., steering mechanism, one-pedal control 104, or other braking mechanism as mentioned herein) and from one or more devices such as cameras. Based upon the data received, the driver instrument module 306 may determine the position of one or more driver instruments and ascertain if the driver instruments have moved with respect to their previous positions. Likewise, the driver instrument module 306 can be configured to use data retrieved from a device such as a camera to ascertain driver reactions (e.g., eye gaze or sudden eye movements) to certain driving contexts 114.

In one embodiment, the driver instrument module 306 includes code that is executable by a processor to determine a position of at least one driver instrument and to convey that data to the motor control module 308, which may be configured to automatically adjust the regenerative intensity of the RBV 102 based also upon the position of at least one driver instrument. The driver instrument module 306 may also include code that is executable by a processor to automatically adjust the regenerative intensity of the vehicle based also upon a change in the position of at least one driver instrument. In one embodiment, the driver instrument may include the one-pedal control 104, a steering mechanism, or a braking device. In such embodiment, the driver instrument module 306 may include code executable by a processor to determine a position of each of multiple driver instruments. The apparatus 300 may be configured to automatically adjust the regenerative intensity of the RBV 102 based upon a change in the position of one or more driver instruments.

The notification module 310, in one embodiment, may be configured to notify the driver that the motor control module 308 has automatically adjusted the regenerative intensity. The notification module 310 may alert the driver in various ways, including but not limited to visual devices such as gauges, lights, etc., haptic feedback devices located in close contact to the driver, such as on the steering mechanism or pedal, paddle, lever, seat, etc. By so doing, the notification module 310 assists the driver to recognize potentially dangerous driving conditions and how to operate the RBV 102 more efficiently and safely.

Figure 4:
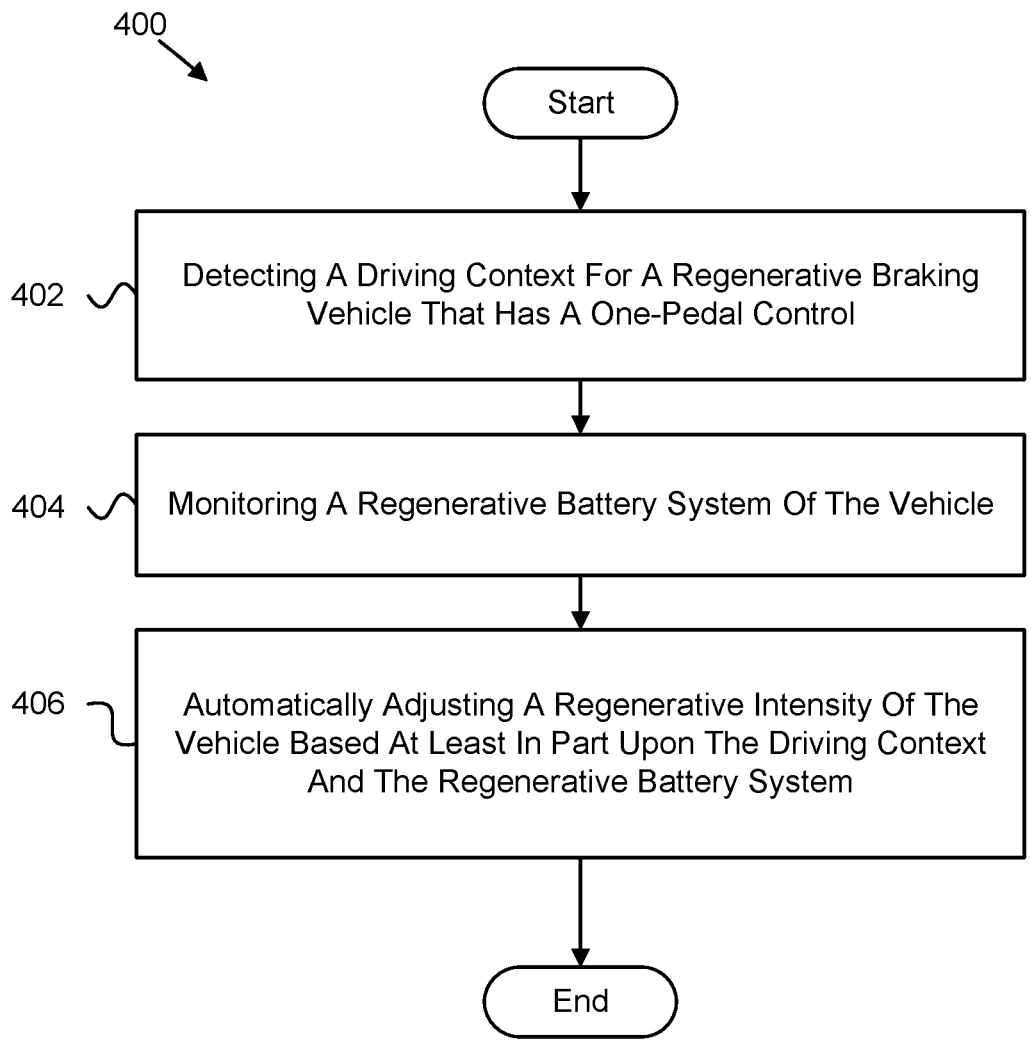
FIG. 4 is a schematic flow chart diagram illustrating one embodiment of a method for automated assistance with one-pedal driving.

FIG. 4 is a schematic flow chart diagram illustrating one embodiment of a method 400 for automated assistance with one-pedal driving. In one embodiment, the method 400 begins and detects 402 a driving context 114 for a RBV 102, which has a one-pedal control 104. In further embodiments, the method 400 monitors 404 the regenerative battery system 106 of the RBV 102. In some embodiments, the method 400 automatically adjusts the regenerative intensity of the vehicle based at least in part upon the driving context 114 and the regenerative battery system 106. In one embodiment, the detector module 202, the monitor module 204, and the motor control module 206 perform the various steps of the method 400.

Figure 5:
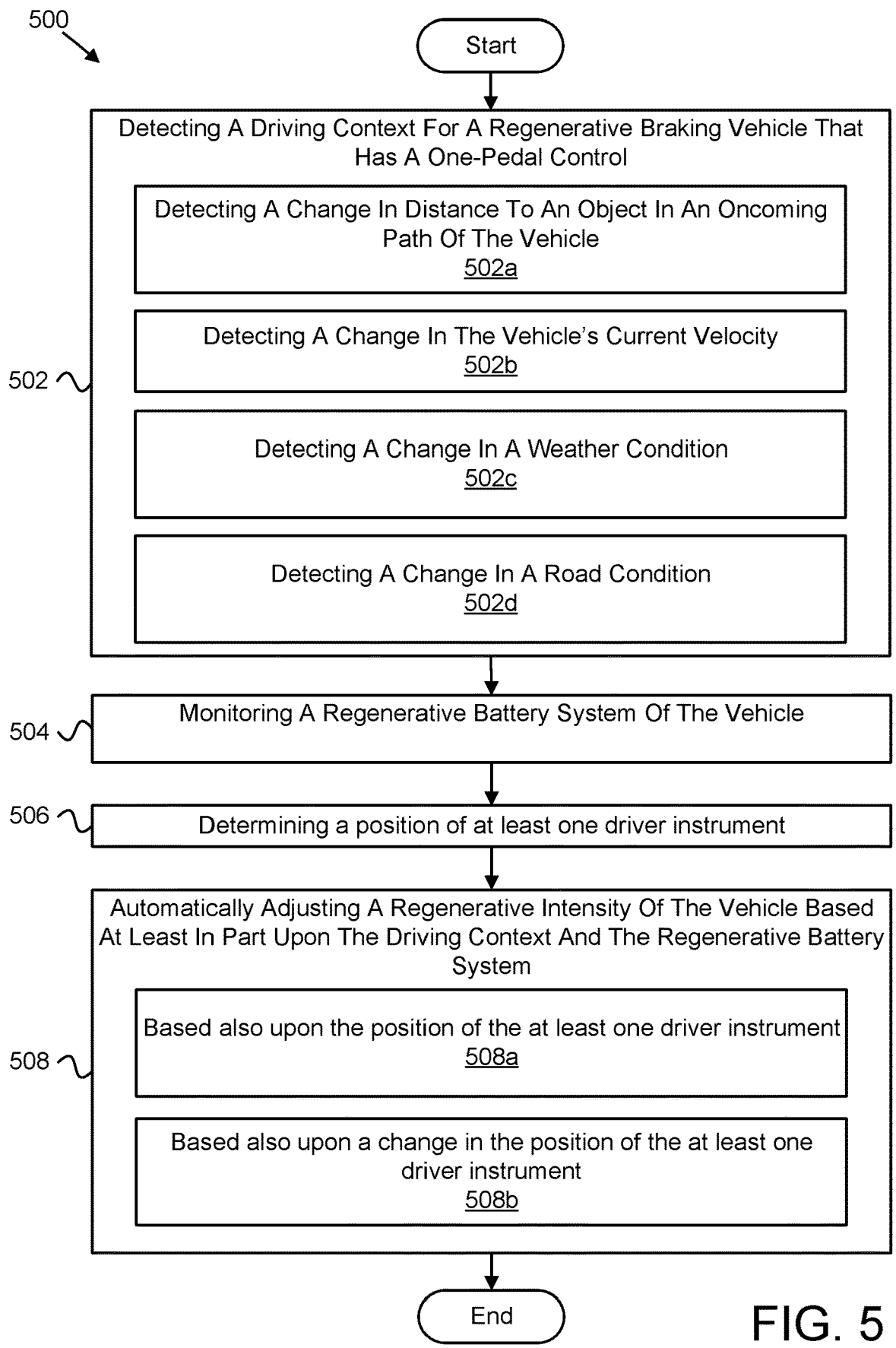
FIG. 5 is a schematic flow chart diagram illustrating one embodiment of another method for automated assistance with one-pedal driving.

FIG. 5 is a schematic flow chart diagram illustrating one embodiment of another method 500 for automated assistance with one-pedal driving. In one embodiment, the method 500 begins and detects 502 a driving context 102 for a RBV 102 that has the one-pedal control 104. In such embodiment, the method 500 detects 502a a change in distance to an object in an oncoming path of the RBV 102. In certain embodiments, the method 500 detects 502b a change in the vehicle's current velocity. In some embodiments, the method 500 detects 502c a change in a weather condition. In certain embodiments, the method 500 detects 502d a change in a road condition. In certain embodiments, the method 500 may monitor 504 a regenerative battery system 106 of the RBV 102.

In various embodiments, the method 500 may determine 506 a position of at least one driver instrument. In some embodiments, the method 500 may automatically adjust a regenerative intensity of the vehicle based at least in part upon the driving context 114 and the regenerative battery system 106. In such embodiments, the method 500 may also automatically adjust a regenerative intensity of the vehicle based upon a position of the at least one driver instrument 508a. In certain embodiments, the method 500 may also automatically adjust a regenerative intensity of the vehicle based upon a change in the position of the at least one driver instrument 508b. In one embodiment, the detector module 302, the monitor module 304, the driver instrument module 306, and the motor control module 308 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor in a regenerative braking vehicle (RBV), the RBV including a regenerative traction battery including a bank of cell batteries for powering the RBV; and
a memory coupled to the processor, wherein the memory stores code executable by the processor to:
detect a driving context for the RBV,
track a driver's response to the driving context,
monitor the regenerative traction battery of the RBV to detect an amount of charge and discharge occurring in the regenerative traction battery, and
automatically adjust a regenerative intensity of the RBV based on a combination of the driver's response to the driving context and the amount of charge and discharge occurring in the regenerative traction battery,
wherein:
the regenerative intensity of the RBV is automatically adjusted to increase or decrease the regenerative intensity in response to detecting at least one of unbalanced charge in the cell batteries of the bank of cell batteries or uneven wear levels in the cell batteries of the bank of cell batteries of the regenerative traction battery.

2. The apparatus of claim 1, wherein the code is further executable by the processor to:
determine a position of at least one driver instrument;

wherein the driver's response to the driving context is based on the position of the at least one driver instrument.

3. The apparatus of claim 2, wherein the code is further executable by the processor to:
automatically adjust the regenerative intensity of the vehicle based on a change in the position of the at least one driver instrument.

4. The apparatus of claim 3, wherein the at least one driver instrument includes one of a one-pedal control, a steering mechanism, or a braking device.

5. The apparatus of claim 1, wherein:
the RBV further comprises a plurality of driver instruments; and
the code is executable by the processor to:
determine a position of each of the plurality of driver instruments,
wherein the driver's response to the driving context is based on a change in the respective position of each of the plurality of driver instruments.

6. The apparatus of claim 1, wherein the code is executable by the processor to notify a driver of the RBV of the automatic adjustment of the regenerative intensity of the RBV.

7. The apparatus of claim 1, wherein the driving context includes an eye gaze of a driver of the RBV.

8. The apparatus of claim 1, wherein the driving context includes a distance to an object in an oncoming path of the RBV.

9. The apparatus of claim 8, wherein the object is moving.

10. The apparatus of claim 1, wherein the driving context includes one of a weather condition or a road condition.

11. The apparatus of claim 1, wherein the regenerative intensity of the RBV is automatically adjusted to increase or decrease the regenerative intensity in response to detecting at least one of unbalanced charge in the cell batteries of the bank of cell batteries or uneven wear levels in the cell batteries of the bank of cell batteries of the regenerative traction battery to maintain a health of the cell batteries of the bank of cell batteries or when the cell batteries of the bank of cell batteries are healthy.

12. A method, comprising:
detecting a driving context for a regenerative braking vehicle (RBV), the RBV including a regenerative traction battery including a bank of cell batteries for powering the RBV;
tracking a driver's response to the driving context;
monitoring the regenerative traction battery of the RBV to detect an amount of charge and discharge occurring in the regenerative traction battery; and
automatically adjusting a regenerative intensity of the RBV based on a combination of the driver's response to the driving context and the amount of charge and discharge occurring in the regenerative traction battery,
wherein:
the regenerative intensity of the RBV is automatically adjusted to increase or decrease the regenerative intensity in response to detecting at least one of unbalanced charge in the cell batteries of the bank of cell batteries or uneven wear levels in the cell batteries of the bank of cell batteries of the regenerative traction battery.

13. The method of claim 12, further comprising:
determining a position of at least one driver instrument;
wherein the driver's response to the driving context is based the position of the at least one driver instrument.

14. The method of claim 13, wherein the at least one driver instrument comprises at least one of a one-pedal control, a steering mechanism, or a braking device.

15. The method of claim 12, wherein the driving context includes a change in a current velocity of the RBV.

16. The method of claim 12, wherein the driving context includes a change in a distance to an object in an oncoming path of the RBV.

17. The method of claim 16, wherein the object is moving.

18. The method of claim 12, wherein the driving context includes a change in a weather condition.

19. The method of claim 12, wherein the driving context includes a change in a road condition.

20. A program product comprising a non-transitory computer-readable storage medium that stores code executable by a processor, the executable code comprising code, that when executed by a processor, causes the processor to:
detect a driving context for a regenerative braking vehicle (RBV), the RBV including a regenerative traction battery including a bank of cell batteries for powering the RBV;
track a driver's response to the driving context;
monitor the regenerative traction battery of the RBV to detect an amount of charge and discharge occurring in the regenerative traction battery; and
automatically adjust a regenerative intensity of the RBV based on a combination of the driver's response to the driving context and the amount of charge and discharge occurring in the regenerative traction battery,
wherein:
the regenerative intensity of the RBV is automatically adjusted to increase or decrease the regenerative intensity in response to detecting at least one of unbalanced charge in the cell batteries of the bank of cell batteries or uneven wear levels in the cell batteries of the bank of cell batteries of the regenerative traction battery.

* * * * *